United States Patent [19]

Reuber et al.

[11] Patent Number: 5,370,429
[45] Date of Patent: Dec. 6, 1994

[54] BUMPER SYSTEM HAVING AN EXTENDABLE BUMPER FOR AUTOMOTIVE VEHICLES

[75] Inventors: Gerhard Reuber, Drolshagen; Achim Braun, Nuembrecht, both of Germany

[73] Assignee: Alfred Teves GmbH & Co., oHG, Bergneustadt, Germany

[21] Appl. No.: 971,929

[22] PCT Filed: Feb. 19, 1992

[86] PCT No.: PCT/EP92/00345

§ 371 Date: Dec. 21, 1992

§ 102(e) Date: Dec. 21, 1992

[87] PCT Pub. No.: WO92/18355

PCT Pub. Date: Oct. 29, 1992

[30] Foreign Application Priority Data

Apr. 20, 1991 [DE] Germany ............... 4113031

[51] Int. Cl.⁵ .................................. B60R 19/40
[52] U.S. Cl. ......................... 293/119; 293/134; 188/289
[58] Field of Search .............. 293/119, 118, 134; 188/316, 289

[56] References Cited

U.S. PATENT DOCUMENTS

| | | | |
|---|---|---|---|
| 3,152,667 | 10/1964 | Powell | 188/289 |
| 3,860,225 | 1/1975 | Nakamura | 293/134 X |
| 3,934,912 | 1/1976 | Ogihara et al. | 293/119 |
| 3,947,061 | 3/1976 | Ellis | |
| 3,972,551 | 8/1976 | Fannin | 293/134 |
| 4,474,257 | 10/1984 | Lee | 293/118 X |
| 4,518,183 | 5/1985 | Lee | 293/118 |
| 5,011,205 | 4/1991 | Liu | 293/134 X |

FOREIGN PATENT DOCUMENTS

| | | |
|---|---|---|
| 6654374 | 9/1975 | Australia . |
| 0332830 | 9/1989 | European Pat. Off. . |
| 1192983 | 10/1959 | France . |
| 2191503 | 2/1974 | France . |
| 2194170 | 2/1974 | France . |
| 1093233 | 11/1960 | Germany . |
| 2947947 | 7/1981 | Germany . |
| 3149113 | 1/1982 | Germany . |
| 8508904 | 6/1985 | Germany . |
| 133262 | 5/1990 | Japan ............ 293/118 |
| 519767 | 4/1940 | United Kingdom ..... 188/289 |

*Primary Examiner*—David M. Mitchell
*Assistant Examiner*—Gary C. Hoge
*Attorney, Agent, or Firm*—Robert P. Seitter; J. Gordon Lewis

[57] ABSTRACT

A bumper system including an extendable bumper resiliently disposed in the direction of impact. The system is compact and, even at elevated impact speeds, protects the automotive vehicle against damage. The bumper is extended by an adequate amount before or during the situation of danger. A progressive damping characteristic and a suitable drive to quickly extend and to safely return the bumper are provided.

7 Claims, 5 Drawing Sheets

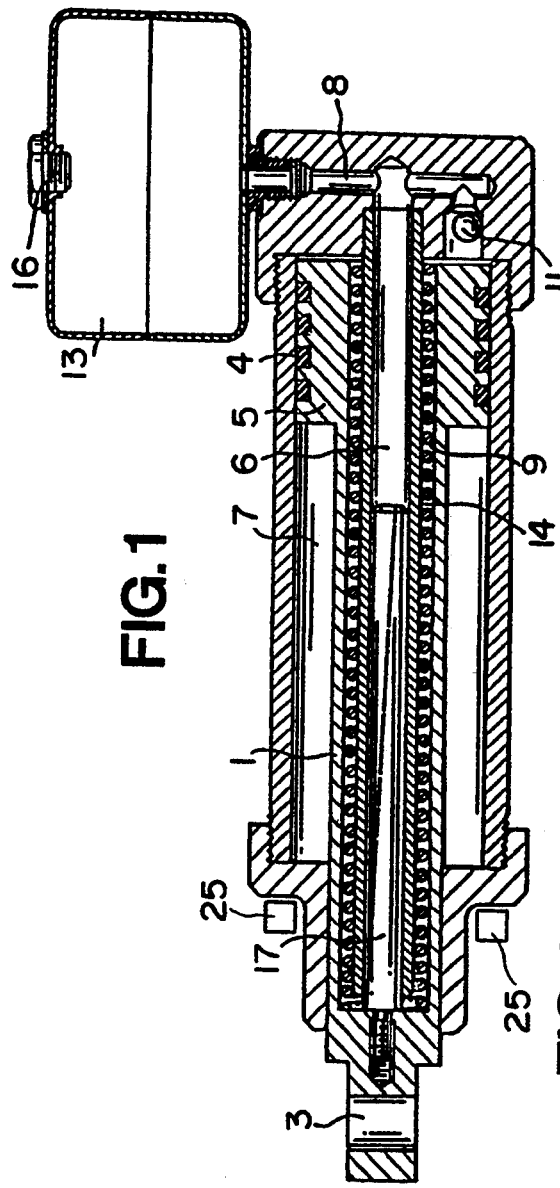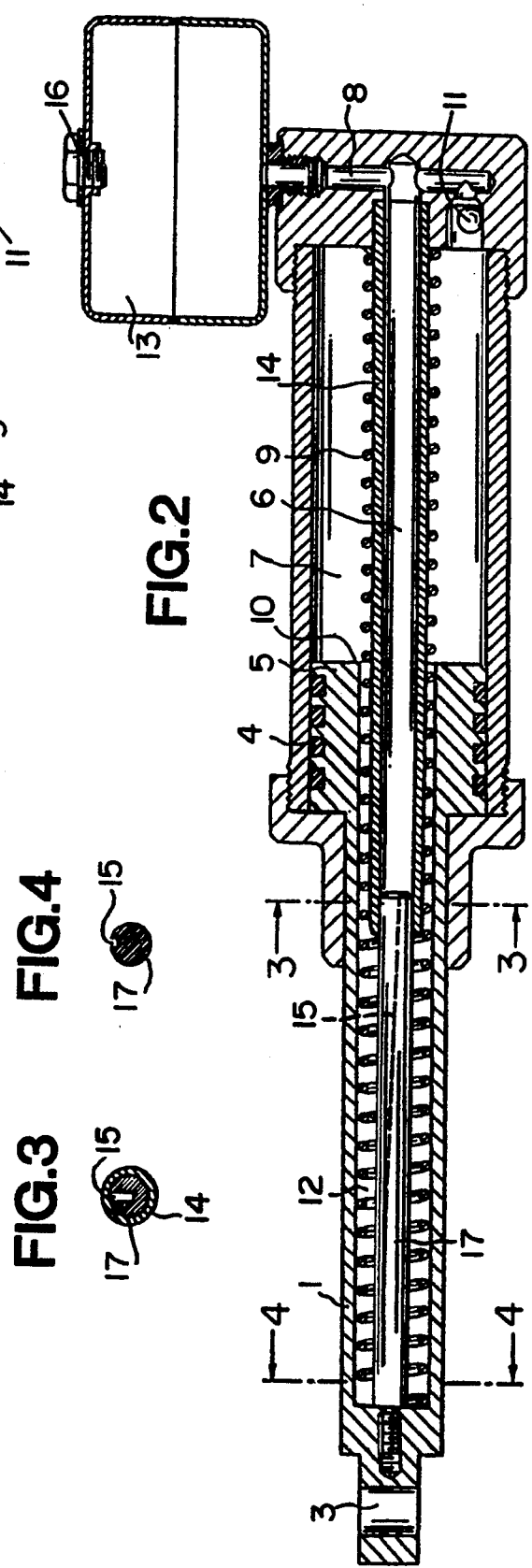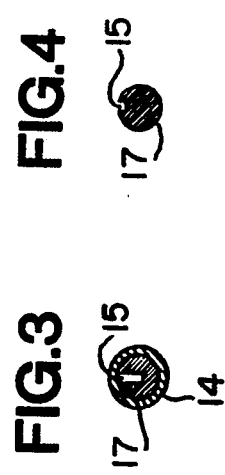

BUMPER SYSTEM HAVING AN EXTENDABLE BUMPER FOR AUTOMOTIVE VEHICLES

BACKGROUND OF THE INVENTION

Along with a growing demand for safety in automotive vehicles, particularly in private passenger cars, and more particularly for the passengers thereof, improved bumper systems have been suggested. Such systems can, in accordance with the EEC-standard, stop a car from a speed of 4 km/h without damage. In addition, such improved systems can, according to the corresponding US-standard, stop automotive vehicles from a speed of about 8 km/h without damage.

Further improved bumper systems are designed to absorb speeds of up to 15 km/h without damage to the vehicle. Calculations indicate, however, that the front end of the bumper so-designed would have to project at least 10 cm beyond the customary standard. A design of that type would be disadvantageous both in terms of space requirements and for reasons of aesthetics.

German Patent Number 31 49 113 teaches an extendable bumper configuration. The bumper retracts in the event of a crash and, at the same time, the steering wheel is placed in a position harmless to the driver.

Moreover, German Patent Number 29 47 947 teaches movably attaching a bumper to the vehicle. The bumper is connected to two parallel, horizontal rods extending in the longitudinal direction of the automotive vehicle. At the opposite sides of each rod is a piston-type element. These elements are disposed in cylinders filled with liquid.

German utility model number 85 08 904 discloses bumpers provided with a hose-type cavity sealable in an air-tight manner. The flexibility of the bumper results from pneumatic pressure.

It is an object of the present invention, therefore, to solve the problem of providing a space-saving, aesthetically pleasing bumper system which can absorb speeds of 15 km/h without damage to the vehicle and, in addition, can extend the bumper at an adequate speed.

SUMMARY OF THE INVENTION

This problem is solved by extending the bumper by an adequate amount only in dangerous situations. After the dangerous situation has been overcome, the bumper, selectively, is retracted automatically or at a later time.

In bumper systems of the afore-mentioned type, it is important for the bumper to (1) provide an adequate distance between the obstacle and the direct contour of the vehicle to be protected and to (2) concurrently and optimally use the available free space to remove the dynamic energy of the vehicle which increases risk in dangerous situations. Both requirements are met, according to another embodiment of the present invention, by constructing the bumper so that the impact of the vehicle is absorbed by a damper consisting of pressure fluid.

To the extent that the pressure fluid is a liquid, preferably a brake fluid, the present invention provides an equilibrium chamber for the fluid from which, during extension of the bumper, fluid can be fed into the cylinder through an opening valve.

According to still another embodiment of the present invention, the cylinder is connected, through a throttle, to the equilibrium chamber. That connection improves the damping and energy intake of the system and flexibly stops the vehicle when it strikes an obstacle.

Moreover, in accordance with a further embodiment of the present invention, a special equilibrium reservoir is provided. The equilibrium chamber can be annularly disposed about the cylinder, thereby attaining a more compact design.

The length of the extending bumper movement can be made dependent on the momentarily existing condition of danger. On the other hand, the damage to the vehicle to be protected is decreased the more softly the impacting vehicle is stopped (and, vice versa, the softer is the impact of the obstacle on the vehicle). According to another embodiment of the present invention, therefore, both the elasticity and the spring constant of the bumper system are dependent on the extended length of the bumper. In pressure-fluid damped bumpers, preferably, the equilibrium hole between the equilibrium chamber and the cylinder is varied in response to the position of the bumper: the larger the hole, the greater the extension of the bumper. Thus, the bumper gives a harder response the more it is retracted, either from the start or due to an impact.

An additional structural feature of the present invention is that the inside opening of the groove, which conducts the damping liquid, consistently decreases as the bumper retracts.

Because dangerous situations are likely to occur instantaneously, the bumper should extend rapidly. If an extending time not exceeding one second is desired, the bumper is provided with a spring energy reservoir which, if so required, is unloaded to rapidly extend the bumper. The movement of extension is about 10 cm. An extension by that amount is advisable at a vehicle speed from about 10 km/h.

Another alternative for extending the bumper, which is also suitable for the subsequent retraction, uses a pressure fluid pump. The pump stores the corresponding pressure fluid pressure in the cylinder in order to rapidly extend, when needed, via the piston of the bumper. If the corresponding vacuum is generated by the pump, it is possible to retract the piston.

With the aid of suitably disposed valves, the cylinder, in the event of a crash, is blocked from the equilibrium chamber. The valve opening during the return of the bumper must immediately close if, during the retraction movement, a sudden crash occurs so that the bumper, also in the intermediate position, is operative.

To improve elasticity and to reduce the liquid pressure fluid requirements, another embodiment of the invention closes the equilibrium chamber during a crash at the air-filled end. The elasticity of the bumper system is improved by forming the air-filled part of the equilibrium chamber. Conversely, the bumper can be extended through a gaseous pressure fluid (air) conveying pump. Gas or air is fed, at excess pressure, through the pump and into the equilibrium chamber. Between the two different pressure fluids is provided a mechanical separating layer, which, according to another embodiment of the present invention, can comprise a displaceable sealing ring neatly separating the two pressure fluids.

If the use of a pump for withdrawing the bumper is avoided, in accordance with another embodiment of the present invention, an electric drive is provided. At an adequate transmission ratio, the drive can be used to extend the bumper. To insure the efficiency of the bumper in intermediate positions, it is possible to forego, in special cases, the use of pressure fluid altogether. The cushioning effect of the spring of the spring-energy reservoir is used for the flexible absorbance of the impact energy while the entire bumper system is retracted by the electromotor, thereby enabling the spring-energy reservoir to be reloaded.

With respect to the return of the extended bumper, according to another embodiment of the present invention, a prestressed pressure fluid chamber is provided.

The required speed of the extension movement is determined by the severity of the dangerous situation as detected by a sensor. In the case of an imminent accident, the extension movement must be effected very quickly. This occurs, for example, upon the release of a violent braking operation or a heavy deceleration of the automobile. Otherwise, the extension movement can be effected at a relatively slow rate, for example, when the extension is effected only in response to a potentially enhanced danger such as an increased speed.

DESCRIPTION OF THE DRAWINGS

Further features of the invention will be explained with reference to the drawing, wherein:

FIGS. 1 to 4 show a first embodiment of the invention,

DETAILED DESCRIPTION OF PREFERRED EMBODIMENTS

Figure 5:
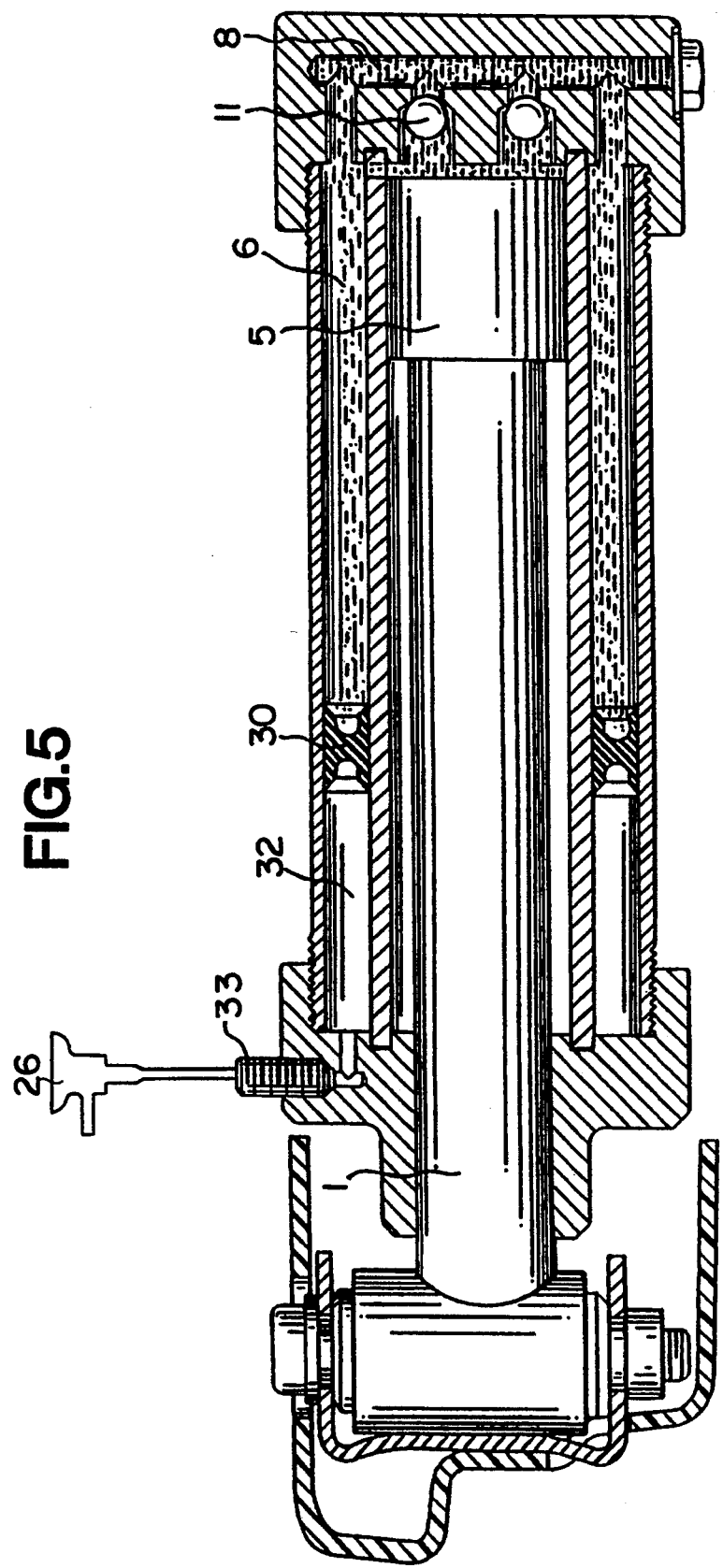
FIGS. 5 to 7 show a second embodiment of the invention.

Now, referring to the drawings, FIGS. 1 to 4 illustrate the essential parts of a first embodiment of the bumper system according to the present invention. Omitted is the mechanism used to return the bumper. In addition to the missing release for the drive, FIGS. 1 and 2 do not show the locking means holding the system in the initial position as shown in FIG. 1.

FIGS. 1 and 2 show a tubular piston rod 1 at the end of which a mounting hole 3 is provided and to which the bumper blade, disposed normal to the plane of view, may be secured. Usually, two systems as illustrated in FIG. 1 are provided for mounting the bumper blade (not shown). However, it is equally possible that more than two systems connected in parallel may support the bumper blade. The vehicle-side end of the piston rod 1 becomes a piston 5 guided within a cylinder 7. The piston 5 is sealed against the outer wall of the cylinder 7 by sealants 4.

A cylindrically shaped equilibrium chamber 6 concentric to the cylinder 7 communicates, through an equilibrium conduit 8, with an equilibrium reservoir 13. Located between the cylinder 7 and a cylindrically shaped connecting chamber 12 within the piston rod 1 is an annular equilibrium hole 10 interconnecting the two chambers. The connecting chamber 12 and the equilibrium chamber 6 are interconnected through a throttling groove 15 provided in a cylindrical pin 17. The cylindrical pin 17 is screwed to the bumper-side end of the piston rod 1 and protrudes through the connecting chamber 12 into the equilibrium chamber 6 wherein it is slidingly guided.

As conveyed by FIGS. 3 and 4, the throttling groove 15 provided in the cylindrical pin 17 is tapered toward the bumper blade and, hence, toward the mounting hole 3. Since, as shown by FIGS. 1 to 3, the cylindrical pin 17 is sealingly guided by the cylindrical walls of the equilibrium cylinder 14 confining the equilibrium chamber 6, the throttling effect between the cylinder 7 and the equilibrium chamber 6 is determined by the inside diameter of the throttling groove 15. In the extended position of the piston rod 1, that diameter may be relatively large (see FIG. 3) while, in the retracted position (shown in FIG. 1) of the piston rod 1, the diameter may be constricted as shown in FIG. 4.

A helical spring 9 having the effect of a spring-energy reservoir protrudes through the annular equilibrium hole 10. The spring rapidly extends, if so required, the piston rod 1 from the position as shown in FIG. 1 into the position as shown in FIG. 2. Previously described, but not shown, is the manner in which the piston rod 1 is blocked in its resting position shown in FIG. 1.

To enable the piston rod 1 to be quickly extended, the enlarging cylinder 7 must be rapidly filled with pressure fluid. In the present example, such fluid is a liquid, preferably brake fluid. This is performed by the ball valve 11 which opens during extension of the piston rod 1, thereby directing the hydraulic fluid emerging from the equilibrium reservoir 13 through the equilibrium conduit 8 and into the cylinder 7. If, conversely, a force directed to the right in FIG. 2 is exerted through the bumper blade on the piston rod 1, the valve 11 closes. Consequently, the pressure fluid is displaced by the piston 5 through the equilibrium hole 10, the throttle groove 15, the equilibrium chamber 6, and to the equilibrium reservoir 13.

As previously discussed, the inside diameter of the throttle is variable in response to the position of the piston rod 1 so that the resilient effect of the bumper system is increasingly reduced as the piston rod retracts.

In response to the driving speed of the vehicle, varying positions of piston rod extension are provided if no situation of imminent danger exists but rather only a situation of potentially enhanced danger caused by speed. Automotive vehicles driven at a very low speed are not required to have bumpers fully extended; the length of extension is rather adapted to the speed and, hence, to the potential danger. If a dangerous event does, in fact, occur, the piston rod 1 is fully extended. The dangerous situation is recognizable by a particularly high deceleration of the automotive vehicle, a particularly high braking movement of the driver, or by other parameters, such as sensors 25 responding to a changed distance from the obstacle, to the distance itself, or to similar measurements.

Figure 6:
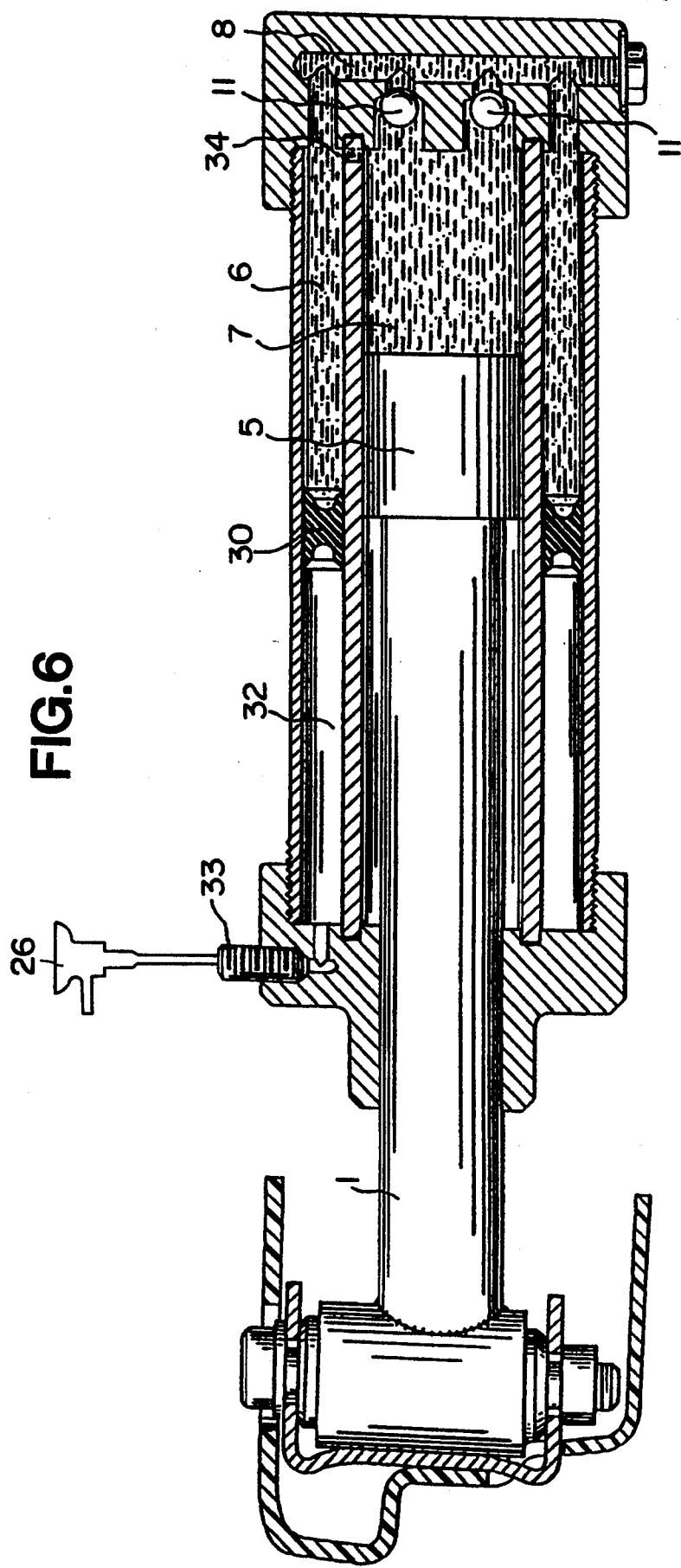
Figure 7:
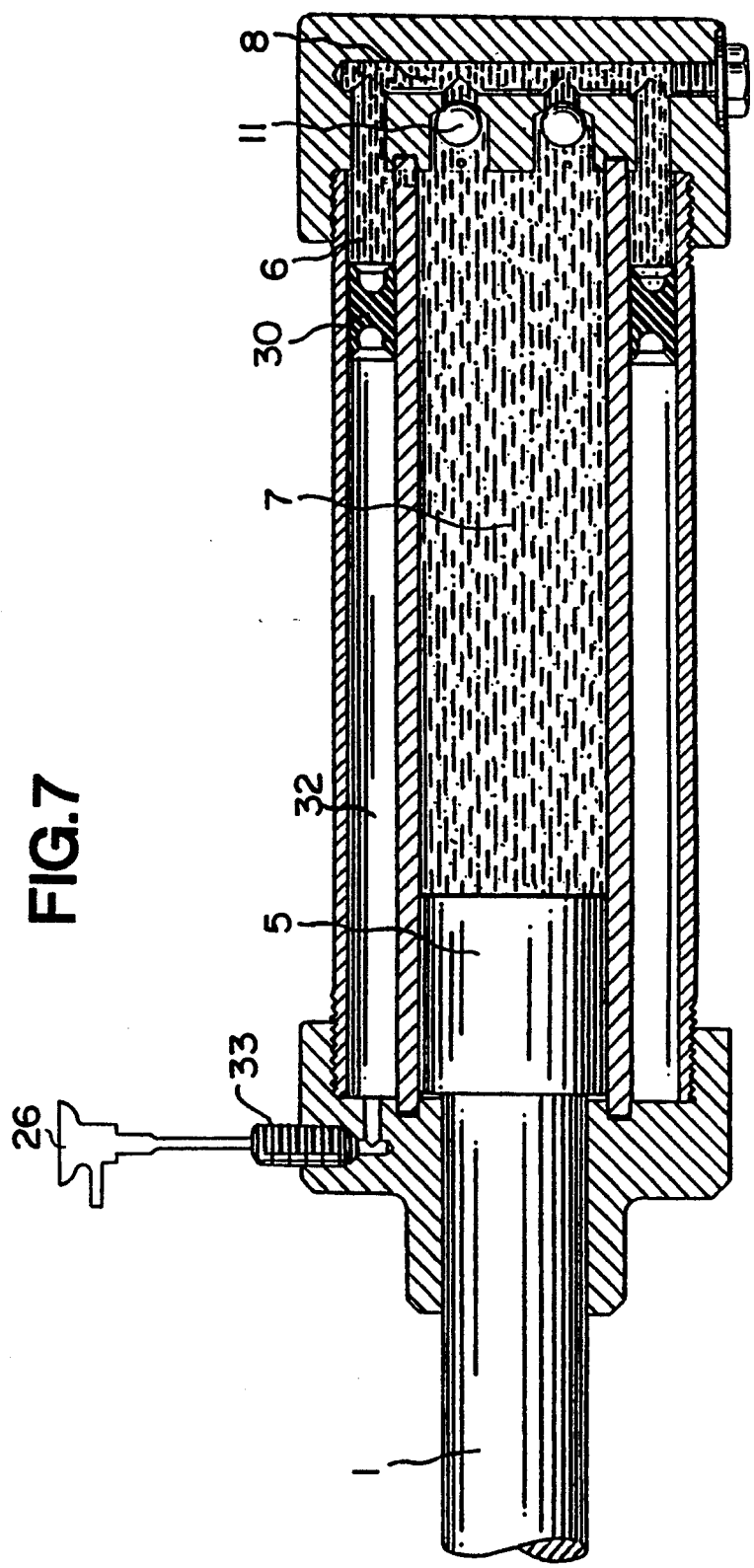

FIGS. 5 to 7 illustrate another embodiment of the bumper system according to the present invention. Not shown is the locking in the resting position of the piston rod 1. The same reference numerals used in FIGS. 1 to 4 have been used for corresponding components. The piston 5 at the end of the piston rod 1, again, moves within a cylinder 7 filled with a liquid fluid, preferably brake fluid. The cylinder 7, through two ball valves and an equilibrium conduit 8, communicates with an equilibrium chamber 6 annularly surrounding the cylinder 7. Equilibrium chamber 6 is closed by a pneumatic valve 33. The equilibrium chamber 6, in part, contains liquid. The partial chamber 32 of the equilibrium chamber 6 is filled with a pneumatic pressure fluid, preferably air. The pneumatic valve 33 has the same function as the closure nut 16 shown in FIGS. 1 and 2, i.e., it readily admits air to the partial chamber 32, thereby supporting an easy extension of the piston rod 1. Conversely, pneumatic valve 33 is closed by excess pressure emerging from the partial chamber 32 against the ambient atmosphere.

A comparable effect is exerted by the ball valves 11. Ball valves 11 readily admit, during extension of the piston rod 1, pressure fluid into the enlarging cylinder 7. Ball valves 11 close the cylinder 7 from the equilibrium chamber 6 when the piston 5, in the event of a crash, is forced to the right in FIGS. 6 and 7.

An annular sealant 30 (preferably rubber) separates the gaseous and liquid pressure fluids in the equilibrium chamber 6 so that no air can be passed into the cylinder 7 and no liquid will get into the pneumatic valve 33.

Turning to the position as shown in FIG. 7, in the event of a crash the brake fluid is compressed in the cylinder 7 by the piston rod 1. The valves 11 close so that the brake fluid can only escape through a restriction hole 34. The flexibility of the system is based on the inside diameter of the restriction hole 34 and on the pneumatic pressure increasing in the partial chamber 32 by retraction of the piston rod 1. The flexibility of the system is variable. Its basic magnitude is determined by the width of the restriction hole 34. On the other hand, the magnitude of the flexibility of the system is also determined by the growing force of response of the pressure in the partial chamber 32.

One alternative for extending the bumper and, hence, the piston rod 1 forces the pressure fluid from a pressure fluid source (preferably a pneumatic pump 26) through valve 33 and into the partial chamber 32. The annular sealant 30, in FIG. 5, is displaced to the right (see FIG. 6). Consequently, the liquid pressure fluid contained in the equilibrium chamber 6 is forced through the valves 11 and into the cylinder 7, thereby extending the piston rod 1. This capability of driving the piston rod 1 is also provided in the opposite direction. Pressure fluid is sucked out of the partial chamber 32 by a vacuum. The vacuum and the atmospheric pressure on the piston rod 1 serve to retract the piston rod 1. However, this will require additional valves (not shown). In addition to the pneumatic valve 33, such valves are needed to develop a vacuum in the partial chamber 32.

With the system adequately sealed, the piston rod 1 may also be retracted by an external drive. For example, an electromotor may preload the partial chamber 32, by developing excess pressure, such that the resultant excess pressure is adequate to rapidly extend the piston rod 1 when required. The excess pressure in the partial chamber 32, with the piston rod 1 locked in the resting position, in FIG. 5, would assume the function of the spring-energy reservoir with spring 9.

Figure 8:
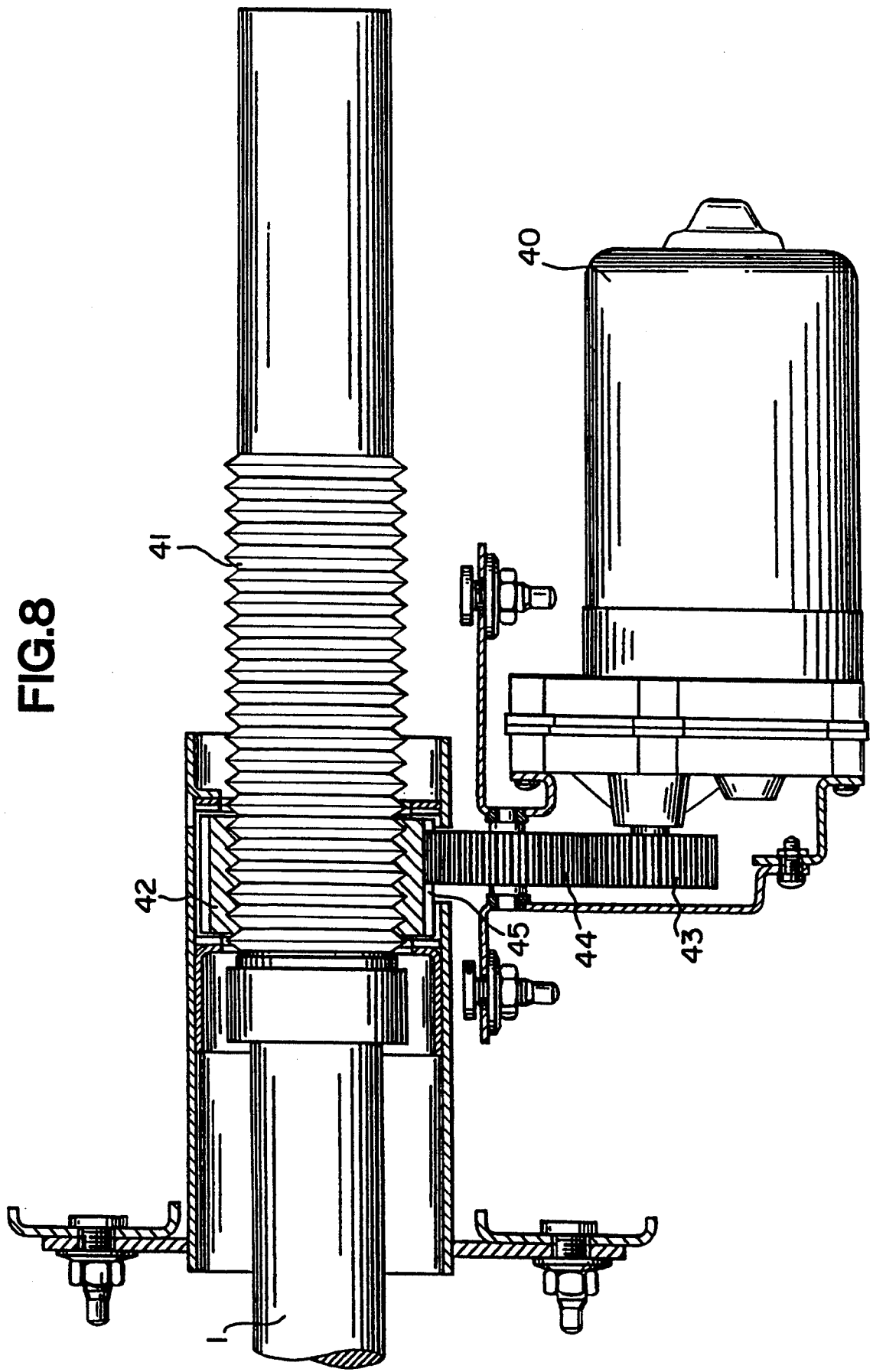
FIG. 8 shows a third embodiment of the invention.

FIG. 8 shows the piston rod 1 driven by an electromotor 40. The piston rod 1, disposed in a non-rotatable yet longitudinally displaceable manner, has a self-locking outer thread 41 engaged by the internal thread of a rotating nut 42 non-displaceable in the longitudinal direction. The nut 42 is driven by the electromotor 40 through a gear transmission with gears 43, 44 engaging the outer toothing 45 of the nut 42. Depending on the rotating direction of the electromotor 40, the piston rod 1 is retracted or extended. The self-locking effect of the thread, consisting of the outer thread 41 and the inner thread of nut 42, effectively blocks piston 1 in any position.

The drive also will offer protection if a crash occurs during a driving movement of the piston rod 1. The drive shown in FIG. 8 supplements the embodiments of the system shown in FIGS. 1 to 4 and 5 to 7, respectively. The speed of extension of the drive shown in FIG. 8 is substantially lower than that of the spring-energy reservoir and it lacks the elastic damping effect of those systems. Hence, the drive of FIG. 8 can be used, for example, to return the piston rod 1 and to load the spring-energy reservoir 9 of the system shown in FIGS. 1 to 4. The drive of FIG. 8 displaces the system from the position shown in FIG. 2 into the position shown in FIG. 1 and locks the system in that position.

The same discussion applies, with necessary changes in detail, to loading the system shown in FIGS. 5 to 7. The drive of FIG. 8 displaces the piston rod 1 from the position shown in FIG. 7 into the position shown in FIG. 5 so that the partial chamber 32 receives the excess pressure required for the rapid extension of the piston rod 1.

We claim:

1. A bumper system for an automotive vehicle having an extendable bumper resiliently disposed in the direction of impact, said bumper system comprising:
   a cylinder;
   a piston disposed in said cylinder;
   a piston rod connected to said bumper on one end and to said piston on its opposite end, said piston driving said bumper between a retracted position and a fully extended position;
   a damping fluid present in said cylinder, contacting said piston, and damping movement of said bumper;
   a valve;
   an equilibrium chamber, said equilibrium chamber having said damping fluid and communicating with said cylinder through said valve;
   a cylindrical pin having a groove, said cylindrical pin screwed to said piston rod on said one end of said piston rod opposite said piston and slidingly guided in said equilibrium chamber and said groove formed parallel to said piston rod, tapered toward said bumper, and connecting said cylinder with said equilibrium chamber;
   a spring disposed within said cylinder and engaging said piston, said spring prestressed in the retracted position of said bumper; and
   a sensor controlling the amount by which said bumper is extended and retracted in response to the degree of danger posed for the vehicle.

2. A bumper system for an automotive vehicle having an extendable bumper resiliently disposed in the direction of impact, said bumper system comprising:
   means for resiliently mounting said bumper on said vehicle, said mounting means including:
   a cylinder,
   a piston disposed in said cylinder,
   a piston rod connected to said bumper on one end and to said piston on its opposite end,
   a damping fluid present in said cylinder, contacting said piston, and damping movement of said bumper,
   a valve,
   an equilibrium chamber having said damping fluid and communicating with said cylinder through said valve, and
   a cylindrical pin having a groove, said cylindrical pin screwed to said piston rod on said one end of said piston rod opposite said piston and slidingly guided in said equilibrium chamber and said groove formed parallel to said piston rod, tapered toward said bumper so that the size of said groove decreases as said bumper is retracted, and connecting said cylinder with said equilibrium chamber, wherein the damping effect of said mounting means on said bumper depends upon the position of said bumper;

means for driving said bumper between a retracted position and a fully extended position; and means connected to said driving means for controlling the amount by which said driving means extends and retracts said bumper.

3. The bumper system as claimed in claim 2 wherein said driving means includes a spring disposed within said cylinder and engaging said piston, said spring prestressed in the retracted position of said bumper.

4. The bumper system as claimed in claim 3 wherein said spring is a helical spring.

5. The bumper system as claimed in claim 4 wherein said piston rod has an external thread and said driving means further includes (a) a nut engaging said external thread on said piston rod and (b) an electromotor driving said nut.

6. The bumper system as claimed in claim 2 wherein said control means is a sensor responsive to the presence of a dangerous situation for the vehicle.

7. The bumper system as claimed in claim 6 wherein said sensor responds to one of the deceleration of the vehicle, the intensity of the braking of the vehicle, the speed of the vehicle, and the measured distance to an obstacle approaching the vehicle.

* * * * *